Dec. 4, 1962  L. V. SORG  3,067,384
BROAD-RANGE DIRECT-READING POLAROGRAPH
Filed Oct. 16, 1959  5 Sheets-Sheet 1

INVENTOR.
Leonard V. Sorg
BY
ATTORNEY

United States Patent Office 3,067,384
Patented Dec. 4, 1962

3,067,384
BROAD-RANGE DIRECT-READING
POLAROGRAPH
Leonard V. Sorg, Kansas City, Mo., assignor to Standard Oil Company, Chicago, Ill., a corporation of Indiana
Filed Oct. 16, 1959, Ser. No. 846,976
5 Claims. (Cl. 324—31)

The present invention relates to apparatus and method for the electrochemical analysis of solutions. More specifically, my invention relates to an improved system for qualitative and/or quantitative polarographic analyses of liquids or solutions, organic or inorganic. Still more specifically my invention relates to a system employing a polarizable electrode such as a dropping mercury electrode for rapidly indicating concentrations of a variety of known metal ions in an electrolyte.

It has long been known that an electrolytic solution permits the flow of current and, at a definite voltage, a characteristic electrode reaction occurs for the particular metal in the solution. The voltage at which this reaction occurs is an identifying voltage. If a voltage less than the identifying voltage is applied between electrodes immersed in a solution of that substance, only a small residual current flows. On the other hand, if a voltage somewhat greater than the identifying voltage is applied, the magnitude of the increase in electrolyzing current is proportional to the concentration of the metal in the test solution. It follows, therefore, that when an increasing voltage is applied between electrodes immersed in a solution of several metal ions no appreciable current will pass until the lowest critical potential is reached. When a voltage somewhat above this value is attained, a current increase occurs proportional to the concentration of the first and corresponding substance; when the next higher identifying potential is reached an abrupt increase in current indicates the presence of the second substance and the current increase measured at a somewhat higher voltage is proportional to the concentration of the second substance. The determination of such a current-voltage curve thus amounts to qualitative and quantitative analysis of the test solution.

A novel polarographic system has been developed by Offutt and Sorg (U.S. Patents 2,773,020; 2,773,021; 2,773,237; ASTM method D 1269) which enables a direct reading of concentrations to be obtained. The system makes use of the "pilot ion" technique, in that the ratio of concentrations between a test metal ion and a second or pilot metal ion is determined, rather than the actual amounts of each ion present. Not only does the Offutt-Sorg system provide a direct reading of test metal ion concentration, but it is virtually completely insensitive to changes in temperature, dilution of the electrolyte, dropping rate of the dropping mercury electrode, and errors in measuring volumes. The system is direct reading, and the result is obtained by the use of a set of potential divider circuits, adapted to impress a series of successively decreased or increased voltages across the test solution in the cell containing the dropping mercury electrode. An associated current-measuring network is adapted to indicate visually a relationship between the resulting currents passing through the test solution in such a way that the test metal ion concentration is revealed directly from a dial scale associated with the current-measuring network.

The primary object of the instant invention is to extend the usefulness of the Offutt-Sorg type system by making a single polarographic instrument adaptable to determine the concentrations of a wide variety of test metal ions and any of several pilot metal ions. Other and further objects will be apparent as the description of the invention proceeds.

Briefly, in accordance with the invention, I provide a plurality of interchangeable sets of potential divider circuits, each corresponding to a single combination of a test metal ion and a suitable pilot metal ion. These sets are insertable in the circuit either as plug-in modules or as switchable components.

It has been found that any test metal ion may be analyzed which has a half-wave potential (referred to standard calomel electrode, SCE) in the range of about plus 0.4 volt to about minus 1.4 volts in acid or neutral solution, and which has a single well-defined reduction wave obtained by plotting the diffusion current versus the potential applied. When the limiting diffusion current is substantially directly proportional to the concentration of the metal ion being reduced, the apparatus has a linear reading scale.

It has also been found that virtually any metal may be employed as a pilot ion, provided only that it has half-wave potential characteristics which are similar to those of the test metal ion, and has a limiting diffusion current which differs by at least 0.2 volt from that of the known metal ion.

The analytical results are obtained after applying a series of successively increased or decreased voltages across the test cell and are read directly from a dial scale calibrated for the range of metal concentrations of interest. For optimum versatility, a simple scale with uniformly spaced graduations may be employed, and the ratio of limiting diffusion currents of test metal and pilot metal ions is selected so that the maximum expected concentration of test metal corresponds to full scale on the dial. My improved system will be described hereinafter with reference to a specific embodiment of apparatus and a particular pilot ion.

In the drawings the invention includes the arrangement of apparatus described in connection therewith where corresponding elements are identified by similar reference characters and wherein.

Figure 1:
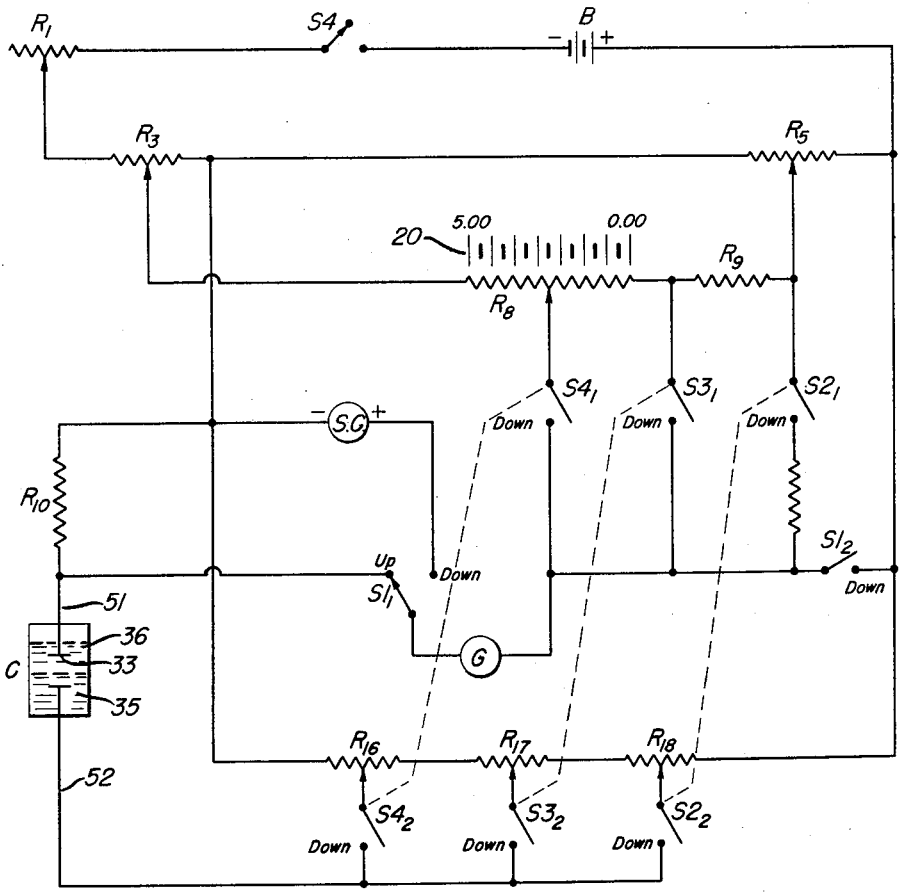
FIGURE 1 is a schematic wiring diagram of one form of the Offutt-Sorg apparatus illustrating the electrical principles employed.

Referring to the wiring diagram shown in FIGURE 1, C is a measuring cell assembly connected in a circuit including a potential divider network composed of electrical potentiometers $R_{16}$, $R_{17}$, and $R_{18}$. The current through this network from battery B is controlled by rheostat $R_1$. For the determination of zinc against a cadmium pilot ion, the voltage supplied by each of the potentiometers $R_{16}$, $R_{17}$, and $R_{18}$ is adjusted by taking taps at potentials of between about 0.4 and about 0.5 volt on potentiometer $R_{16}$, between about 0.8 and about 1.1 volt on potentiometer $R_{17}$, and between 1.4 and 1.6 volt on potentiometer $R_{18}$.

Switches $S1_1$—$S1_2$, $S2_1$—$S2_2$, $S3_1$—$S3_2$ and $S4_1$—$S4_2$ are push button type switches jointly assembled in a latching, inter-releasing mechanism so each may be individually operated, releasing any other switch which may have been previously depressed. By means of these switches the selected potentials may in turn be applied across the electrodes forming a part of the measuring cell assembly C. As a selected potential is applied to the measuring cell C containing the solution of metal ions prepared as described herein, an electrical current flows through the cell which causes a proportional potential drop across resistor $R_{10}$ which is in series with the cell C. This potential drop across $R_{10}$ is measured by the network composed of potentiometer $R_3$ and potentiometer $R_5$, and the associated sub-network including potentiometer $R_8$ and resistor $R_9$. The control of potentiometer $R_8$ is used to actuate a calibrated instrument dial with a scale 20.

For standardization of voltages $S1_1$—$S1_2$ (a push-button operated switch mounted in an assembly with $S2_1$—$S2_2$, $S3_1$—$S3_2$ and $S4_1$—$S4_2$) is actuated by depressing its button, and the galvanometer G is connected in series with a standard voltage reference which may be a standard cell SC, and these two components of the circuit are connected across the $R_{16}$—$R_{17}$—$R_{18}$ network. The galvanometer circuits may include other resistors selected to govern the galvanometer sensitivity in the various functions. With $S1_1$—$S1_2$ depressed adjusting the rheostat $R_1$ to obtain a null reading on the galvanometer G causes standard potential drops across the potentiometer network $R_{16}$—$R_{17}$—$R_{18}$.

Closing switches $S2_1$—$S2_2$ applies a first potential to the measuring cell C and at the same time switch $S1_1$—$S1_2$ is set automatically to connect the galvanometer G between the positive end of $R_{10}$ and the slider of $R_5$ so that a portion of potentiometer $R_5$ may be selected to provide a potential at the slider of $R_5$ equal to the average potential drop across resistor $R_{10}$ due to the residual current plus the diffusion currents of both the metal ion, and the pilot ion. This balance is accomplished by adjusting $R_5$ so that the galvanometer G swings equally to each side of zero, which is considered to be the null condition. The switch $S3_1$—$S3_2$ is then closed, releasing switch $S2_1$—$S2_2$ and applying a second potential to the measuring cell and simultaneously connecting the galvanometer G between the positive end of resistor $R_{10}$ and the negative end of resistor $R_9$. Adjusting the slider of $R_3$ to obtain the null galvanometer condition results in the current through the $R_8$—$R_9$ network being made proportional to the cell current due to the pilot ion alone.

Finally, a third potential is applied by closing push button switch $S4_1$—$S4_2$, releasing $S3_1$—$S3_2$, and connecting the galvanometer G between the positive end of $R_{10}$ and the slider of potentiometer $R_8$. The slider of $R_8$ is adjusted to obtain the null galvanometer condition, the potential drop across the selected portion of $R_8$ being equal to that portion of the potential drop across $R_{10}$ due to the cell current from the metal ion only. With $S4_1$—$S4_2$ closed the potential drop across $R_{10}$ is due to the residual current only and the adjustment of the $R_8$ slider actually serves to subtract the residual current from the metal ion current. This results in the tapped off portion of $R_8$ between its slider and the end next to $R_9$ being proportional to the metal ion current and consequently to the metal ion concentration. In selecting the portion of $R_8$ equivalent to the metal ion concentration, the dial 20 is so positioned that the corresponding concentration of the known metal may be read from the dial scale. The scale 20 is ordinarily uniform in its graduation and is marked in units of, say, lead tetraethyl concentration in a gasoline.

Figure 2:
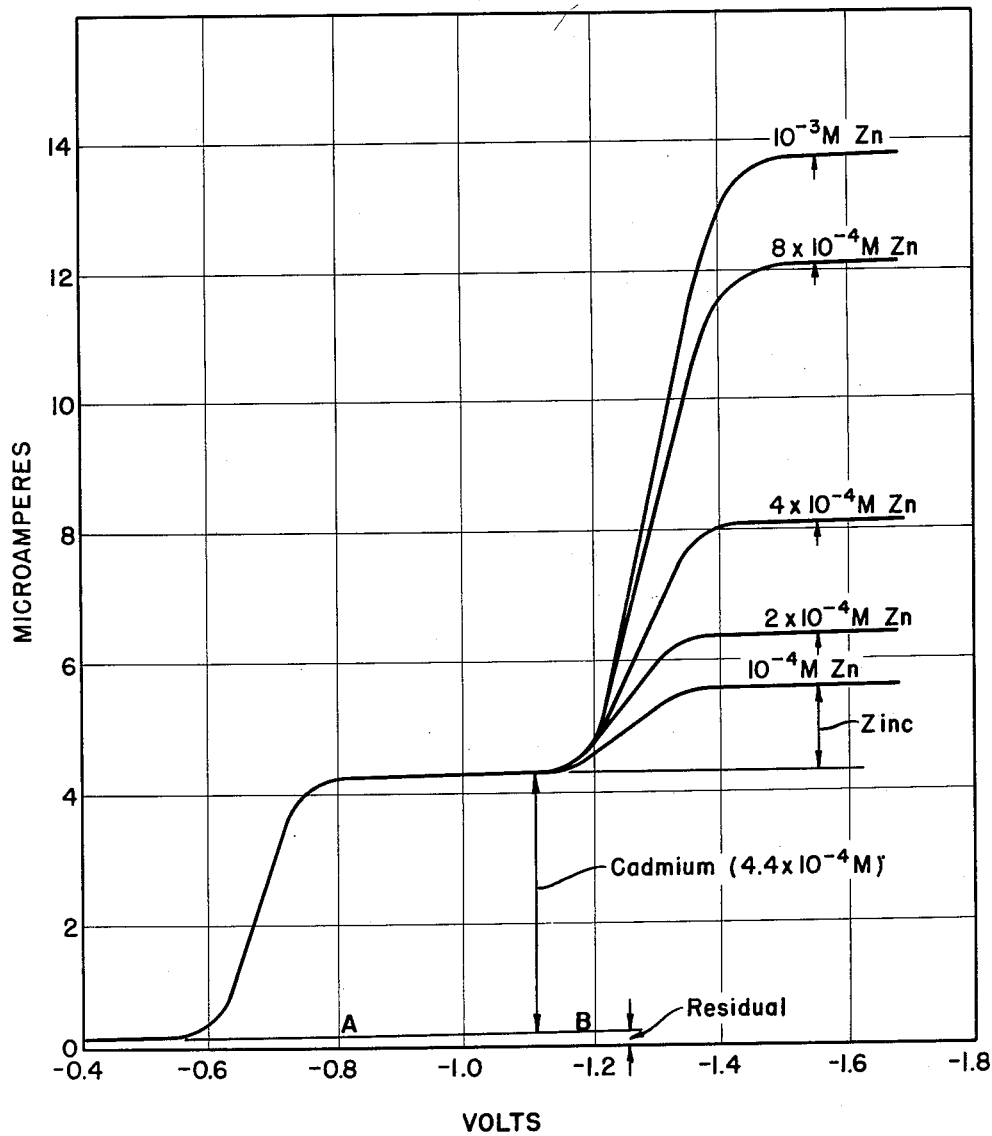
FIGURE 2 is a diagrammatic representation of the current-voltage relationships which exist and make feasible the apparatus illustrated in FIGURES 1 and 3 when employing a pilot ion.

In FIGURE 2, I have shown a set of curves illustrating the characteristic relationship between voltage applied to a test cell, containing a solution, a quiet mercury pool electrode, and a dropping mercury electrode, and the resulting diffusion current due to cadmium and due to five different concentrations of zinc. The voltage values are those impressed across the dropping mercury electrode and the quiet mercury pool electrode with hydrochloric acid as a supporting electrolyte. According to the Offutt-Sorg type system, diffusion currents are not actually measured but rather the magnitude of the current due to the test ion (zinc) is compared with the current due to the pilot (cadmium) ions. The amount of cadmium added to any test solution is uniform and the resultant cadmium ions serve as pilot ions to which the zinc may be referred as an indication of concentration. The current flowing during the application of 1.55 volt is the residual current due to the supporting electrolyte plus the diffusion currents of zinc and cadmium ions. The current obtained by applying 0.95 volt is due to cadmium ions and the residual current. Only the residual current is obtained by impressing a voltage of 0.4 volt.

By comparing the diffusion current due to the zinc ions with that known to be due to cadmium, variations in the readings which result in ordinary apparatus from moderate differences in the mercury dropping rate, the cell temperature, the acidity of the test solution, and the extent of dilution of the solution are nullified as between successive analyses. In addition, comparison of the diffusion current due to zinc with that known to be due to cadmium permits the application of electrical ratio measurements, thereby making possible the direct reading scale.

Figure 3:
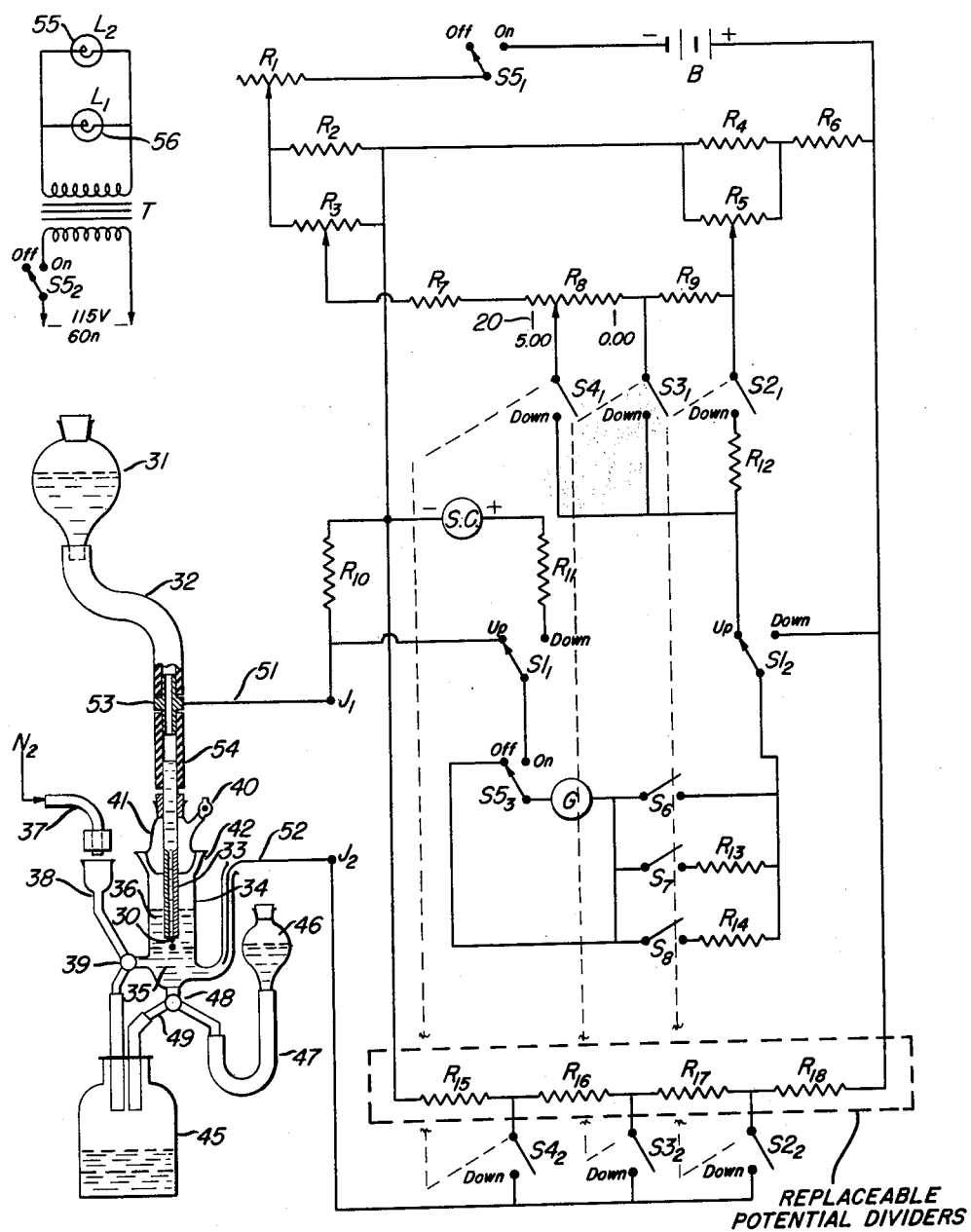
FIGURE 3 is a more detailed schematic representation of a preferred form of the apparatus, showing the relationship of the replaceable potential dividers.

Referring to FIGURE 3 of the drawing showing a preferred form of the apparatus, the measuring cell assembly C includes a dropping mercury electrode 30 developing a series of successively formed mercury spheres or drops. An upper portion of the assembly comprises a mercury reservoir 31 attached by a rigid or flexible tube 32 to a mercury dropping capillary 33.

The easily polarizable dropping mercury electrode for use herein comprises a glass tube having a very fine capillary through which mercury passes downwardly under pressure of a head of mercury in a reservoir above the capillary. The diameter and length of the capillary tube are such that the mercury is discharged from the open end at a slow rate. The delivery end of the tube is immersed in the solution undergoing analysis and the drops of mercury which form at the end of the capillary comprise the cathode of a cell; a pool of mercury collected below the capillary comprises the anode of the test cell.

In the drawing the receiver 31 comprises a leveling bulb, vertical position of which is adjustable to control the head of the capillary electrode 33 to adjust the dropping rate from the mercury electrode 30 at between 13 to 20 drops per minute. The tube 32 is flexible and may be fabricated of plastic, rubber, woven metal, and the like. The upper end of the tube 32 is fixed to the outlet of bulb 31 and the lower end engages a metallic electrical connector 53 comprising a terminal of lead 51. The interior bore of the connector is in electrical contact with the mercury flowing to the capillary 33. A rubber sleeve 54 secures the connector 53 to the upper end of the capillary 33.

The capillary 33 extends into the measuring cell chamber 34 which contains a quiet mercury pool electrode 35 and the solution 36 to be analyzed. The mercury drop formation rate is controlled by the length and bore of the capillary 33 and the head on the mercury in the reservoir 31. A mercury dropping rate of about 15 drops per minute has been found satisfactory. The capillary 33 is adjusted within the cell 34 so that the lower end thereof is immersed within the solution to be analyzed and is approximately one-quarter inch above the surface of the mercury pool 35.

Preliminary to making a test, the cell is stripped and purged with oxygen-free nitrogen introduced by conduit 37 and line 38 for three to five minutes at a rate of about 200–250 ml. per minute to remove oxygen from the solution. In such a purging operation, the stopcock 39 is adjusted to direct the flow into the cell and the purge gas is vented through tap 40, containing a ball check valve, in the upper half of cell 41 connected to the lower half 34 by spherical joint 42. Waste bottle 45 is provided for accumulating the used mercury and spent solution from the test cell and a movable reservoir 46 connected by flexible conduit 47 to stopcock 48 is used to adjust the level of the mercury pool in the cell 34. The stopcock 48 permits drainage of the cell 34 through line 49 into the waste bottle 45.

Electrical leads 51 and 52 are connected to the measuring cell electrodes 33 and 35. The above elements comprise the external portion of the apparatus and the balance of the schematically represented apparatus is housed within a portable case.

Referring to the preferred electrical system illustrated schematically in FIGURE 3, S5 designates a group of three switches assembled in a gang having two positions and connected into three circuits. The switches $S1_1$—$S1_2$, $S2_1$—$S2_2$, $S3_1$—$S3_2$ and $S4_1$—$S4_2$ are mounted in a push-button switch assembly and are individually operated by a latching inter-releasing push-button mechanism. This type of switch is described in detail and is the subject matter of Hall et al. U.S. Patent 2,234,405. Depressing one of the buttons controlling these switches latches the button and automatically releases any other button that may have been previously in the latched position.

The instrument circuit contains three voltage-divider networks, one consisting of seven-ohm wire-wound resistor $R_2$, ten-ohm wire-wound potentiometer control $R_5$, and 100-ohm wire-wound resistor $R_6$.

Another voltage-divider network consists of a 220-ohm wire-wound resistor $R$), the 2000-ohm scale potentiometer $R_8$ and 630-ohm wire-wound precision resistor $R_9$. A third voltage-divider network consists of three wire-wound precision resistors, $R_{15}$ having 320 ohms, $R_{16}$ having 270 ohms, $R_{17}$ having 240 ohms, and $R_{18}$ having 189 ohms. Voltages across the networks described above are standardized for each determination by balancing the voltage of a Weston standard cell (1.019 volt SC) with the voltage drop across the $R_{15}$—$R_{18}$ network by adjusting the current from battery B with the 20-ohm wire-wound rheostat control $R_1$. The battery B produces 3.0 volts and may comprise four dry cells connected in series-parallel.

For zinc and cadmium tests, taps are taken at say 0.4, 0.95, and 1.55 volts. For lead and cadmium tests, taps are taken on the $R_{15}$—$R_{18}$ network at 0.83, 0.59, and 0.32 volts. By means of switches $S2_2$, $S3_2$ and $S4_2$, these potentials may be applied successively across the electrodes 33 and 35, in either decreasing or increasing voltage order.

As a potential of 1.55 volts is applied to the electrodes bridged by a test solution 36 to which a pilot ion has been added as described herein, an electrical current flows through the cell via the dropping mercury electrode 30 and the mercury pool electrode 35, thereby causing a proportional voltage drop across 3000-ohm wire-wound precision resistor $R_{10}$ in series with the cell. This voltage drop, proportional to zinc and cadmium ions and the residual cell current, fluctuates in a regular manner because of the formation of mercury drops at the tip of the capillary 33, and is measured by adjusting the slider of $R_5$. The current through the $R_7$—$R_9$ network is adjusted to be proportional to only the cadmium ions by the positions of the sliders on the potentiometer controls $R_3$ and $R_4$.

To make the adjustments, switch $S2_1$—$S2_2$ is closed, thereby applying 1.55 volt to the dropping mercury electrode 30. The average voltage across the precision resistor $R_{10}$ is balanced by adjusting the slider of potentiometer $R_5$ so that the galvanometer G, connected in the circuit by switch $S1_1$—$S1_2$, swings equally to each side of zero, which is considered to be the null condition. When push-button switch $S3_1$—$S3_2$ is depressed, applying 0.95 volt, the average voltage across the 3,000-ohm resistor $R_{10}$ due now to the residual cell current plus only cadmium ion diffusion currents, is balanced with the voltage drop across resistor $R_9$ by adjusting the potentiometer $R_3$. Thus, the current through the $R_7$—$R_9$ network becomes proportional to the cadmium ion diffusion current as the potential drop across the calibrated resistor $R_9$ is made equal to the potential drop across $R_{10}$ due to the cadmium ion diffusion current. The resulting current through $R_9$ is the same current as that through the total $R_7$—$R_9$ network.

By closing switches $S4_1$—$S4_2$ and applying 0.4 volt, the voltage drop across resistor $R_{10}$ is due to the residual current only. This voltage is balanced by adjusting the silder of calibrated scale of potentiometer $R_8$ and the resultant position of the slider indicates the amount of zinc in the test solution. The position of the slider on $R_8$, determined by bringing the galvanometer G to null, also determines the setting of the linked dial which carries scale 20. Thus, after balancing the galvanometer G with $R_8$, the zinc concentration in the test solution is read directly from the scale 20.

The relationship between the resistances $R_8$ and $R_9$ is adjusted as part of the original instrument calibration. Following the final adjustment in a measurement, the following mathematical ratios are equal:

$$\frac{\text{Right hand portion of Potentiometer } R_8}{\text{Resistor } R_9} = \frac{\text{Zinc-ion diffusion current}}{\text{Cadium-ion diffusion current}}$$

The galvanometer G may have an 1100 ohm coil resistance, with a scale of 0.02 microamp per division and is connected to the appropriate points in the circuit by the action of gang switch 85 and the various push button switches S1, S2, S3 and S4 to serve as a null balance indicator. The resistors $R_{11}$, $R_{12}$, $R_{13}$ and $R_{14}$ govern the effective galvanometer sensitivity in the different measurements and for these various functions the resistances in the circuit indicated in the schematic diagram may be metalized resistors having the following values; $R_{11}$, 0.27 megohm; $R_{12}$, 20,000 ohms; $R_{13}$, 20,000 ohms; and $R_{14}$, 39,000 ohms. Switches S6, S7, and S8 are of the tap-switch type and serve to close the galvanometer circuits only momentarily while instrumental adjustments are being made.

The transformer T, adapted for 60 cycle A.C. and transforming from 115 volts to 6 volts, supplies current for the galvanometer scale lamp 55 and dial lamp 56 illuminating the range scale on the scale 20.

Calibration of the device for any given test metal-pilot metal combination is carried out by means of a standard solution. For measuring TEL (tetraethyllead) in gasoline, the instrument may, for example, be calibrated at points corresponding to 0.5, 1.0, 2.0, 3.0, 4.0, and 5.0 ml. of tetraethyllead per gallon of gasoline. The standard lead solution consists of 1.875 grams of CP lead chloride dissolved in distilled water and diluted to 1000 ml. 10 ml. of the solution are equivalent to the lead contained in 50 ml. of gasoline having one ml. of tetraethyllead per gallon. A portion of the solution equivalent to the desired concentration of tetraethyllead per gallon is admixed with 25 ml. of concentrated hydrochloric acid, 5.0 ml. of pilot ion solution, and 5 ml. of maxima suppressor. The pilot ion solution may, for example, consist of about 5.026 grams C.P. cadmium chloride (2.5 $H_2O$) in 1000 ml. distilled water. The maxima suppressor solution may consist of about one gram of methylene blue dissolved in 1000 ml. of distilled water. The hydrochloric acid used has a specific gravity of 1.8–1.9.

The mixture is diluted to 250 ml. and a portion of the solution, e.g. 10–15 ml. of final solution, is placed in the cell chamber 3 for making the polarographic measurement. Oxygen is purged from the test solution with nitrogen. After the electrical leads 51 and 52 are connected to the measuring cell electrodes, power is supplied to the instrument, switch S5 is turned to the ON position, and the galvanometer G is checked for zero. A fixed pattern of operations, involving the successive impression of the three voltages, is followed in each case by adjustment of the associated potentiometers to produce an average zero on the galvanometer G. Following the final adjustment, the dial scale 20, controlled by the slider on the potentiometer $R_8$, is marked for the equivalent concentration of tetraethyllead per gallon. This procedure is followed in establishing each of the selected calibration points, the points on the scale between the calibrated points being obtained by interpolation.

In making an analysis of a leaded gasoline, the tetraethyllead in a sample of gasoline equivalent to 50 ml. at 60° F. is decomposed with hydrochloric acid and extracted in accordance with method D526–48T described in A.S.T.M. Standards on Petroleum Products and Lubricants, pages 293–295 (1948). To measure the gasoline sample, a pipette is used to deliver the equivalent of 50 ml. of gasoline at 60° F. For actual temperatures differing from 60° F., the stem of the pipette carrying a special scale graduated from 15.6 to 35° C. 5 ml. of the standard cadmium pilot ion solution and 5 ml. of maxima suppressor solution are introduced into the combined acid and aqueous extract contained in a 250 ml. graduated glass stoppered cylinder.

Distilled water is added to the cylinder to make a total solution of about 250 ml. which is thoroughly mixed. 10 to 15 ml. of this final solution are transferred to the measuring cell above the mercury pool therein. Oxygen is purged from the solution by bubbling oxygen-free nitrogen through the solution. The series of progressively decreasing potentials is then applied across the electrodes in the test cell as described above.

A fixed pattern of operations is performed involving the successive impression of the three voltages, followed in each case by adjustment of the associated potentiometer to produce a null condition as indicated by the galvanometer G. The last such adjustment of the slider of resistor $R_8$ linked with the calibrated scale 20 yields the final result of ml. of tetraethyllead per gallon of the gasoline.

The invention has been described with reference to apparatus specifically designed for the determination of zinc in acid solution and lead in gasoline, and a system has been provided wherein successive decreasing potentials are applied. This feature permits the use of my unique apparatus for the direct reading of metal ion concentration. It is also contemplated that the system can be modified for use in the analysis of several metals using a single pilot ion. For example, a double-scaled dial, one scale for lead and one for antimony can be provided and cadmium used as a pilot ion for the determination of antimony in the presence of lead.

As described above, the device may be calibrated upon the establishment of the lead ion-cadmium ratios for various concentrations of lead. After once establishing (1) a single ratio for a given lead concentration and (2) a total scale based upon ratios for the desired spread in lead concentration with fixed pilot ion (cadmium) concentration, it is possible to make use of electrical adjustments in initially calibrating subsequent apparatus and thereby eliminating the actual measurement of solutions (as described above) for subsequent instrument calibrations.

In similar manner, a single instrument may be employed for use with many other test metal-pilot metal combinations merely by selecting the appropriate fixed resistances $R_{15}$, $R_{16}$, $R_{17}$, and $R_{18}$ (FIGURE 3) which comprises a portion of the potential dividing circuit. For convenience, a set of resistances corresponding to a given combination may be assembled in a module and plugged into the direct reading polarograph as desired. Alternatively, appropriate resistances may be individually connected or disconnected in circuit, or a selector switch may be employed to provide potentials according to the principles set forth herein.

Figure 4:
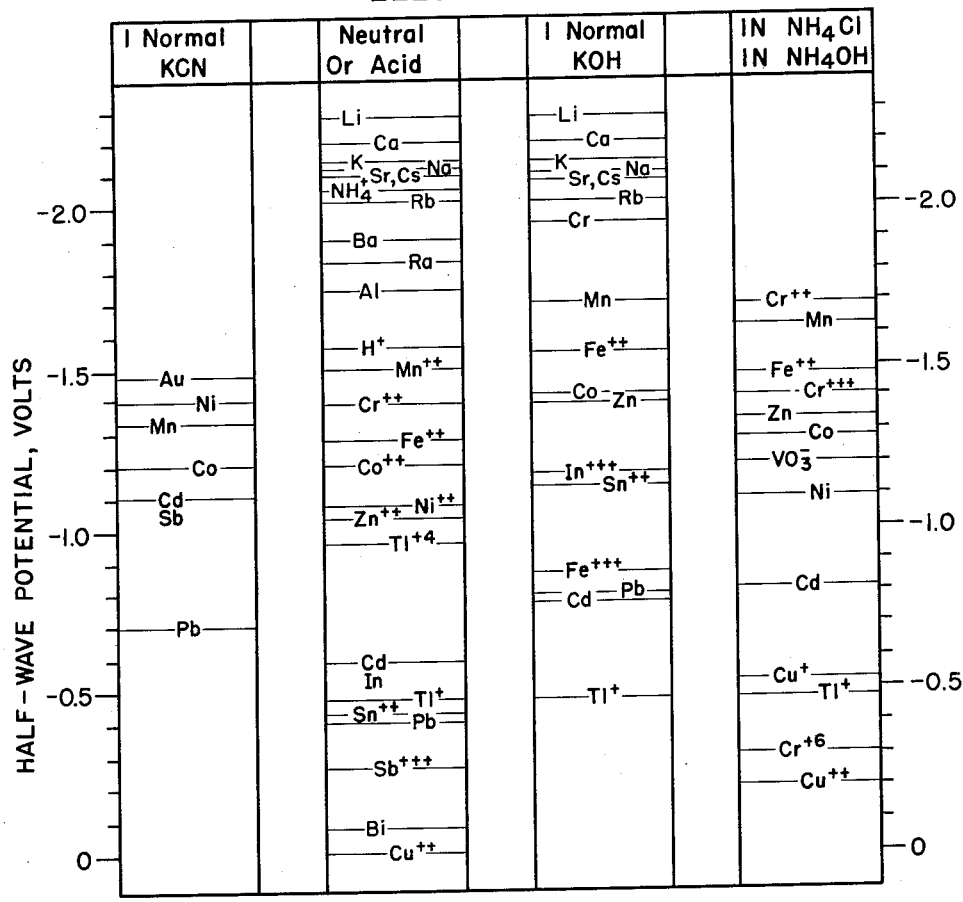
FIGURE 4 shows, in graphic form, the half-wave potentials of several metals in various common electrolytes.

As indicated, a wide variety of test metals and pilot metals may be employed. FIGURE 4 shows a number of metals, in various solutions, which have a single well-defined reduction wave as obtained by plotting the diffusion current versus the potential applied, and which in addition have a limiting diffusion current which is substantially directly proportional to concentration. Any of the indicated metals may be used as test metals or as pilot metals providing their half wave potentials are within a suitable range of the polarograph in the selected electrolyte. A pilot metal should have a half wave potential which differs from that of the test metal by at least about 0.2 volt; it should preferably but not necessarily be below that of the test metal as this permits several circuit simplifications.

Figure 5:
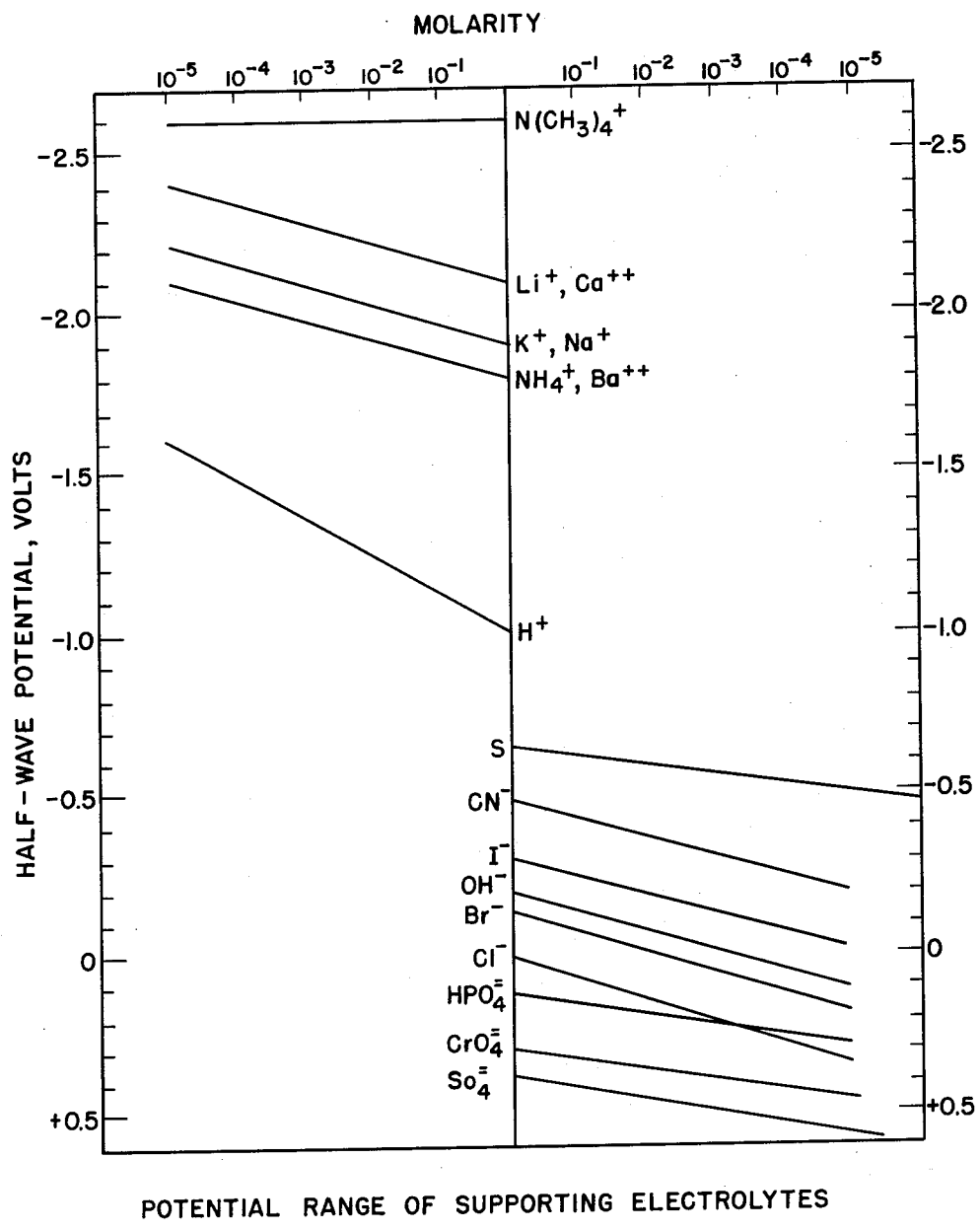
FIGURE 5 shows the potential range of several supporting electrolytes.

For convenience of reference, the potential ranges of several supporting electrolytes are shown in FIGURE 5.

The inventive device has been employed with a large number of combinations of test metals and pilot metals. Some of these are Sn—Cd, Zn—Cd, Ni—Cd, Cu—Zn, Pb—Cu, Pb—Sb, Pb—Zn, Pb—Ni, and Pb—Cr. Selected values of some appropriate potential divider components, and suitable applied potentials thus obtained, are listed below:

| Known Metal | Pilot Metal | Modular Resistances, Ohms | | | | Applied Potential, Volts | | |
|---|---|---|---|---|---|---|---|---|
| | | $R_{15}$ | $R_{16}$ | $R_{17}$ | $R_{18}$ | Residual | Pilot | Test |
| Zinc | Cadmium | | | | | 0.4 | 0.95 | 1.55 |
| Lead | do | 320 | 270 | 240 | 189 | 0.32 | 0.83 | 0.59 |
| Do | Antimony | | | | | 0.08 | 0.32 | 0.75 |

To demonstrate the accuracy and repeatability of the device for routine analytical work, two series of tests were conducted, using lead-cadmium and zinc cadmium pairs. The following results were obtained:

TABLE I

*Lead Analyses*

(Ml. TEL/GAL.)

| | In Standard Solutions | | | | | | In Gasoline | | |
|---|---|---|---|---|---|---|---|---|---|
| Present | 0.0 | 1.0 | 2.0 | 3.0 | 4.0 | 5.0 | 2.86 | 2.45 | 2.61 |
| Found | 0.01 | 1.025 | 1.99 | 2.96 | 3.99 | 4.94 | 2.88 | 2.50 | 2.70 |
| | 0.01 | 1.035 | 2.01 | 2.97 | 3.99 | 4.93 | 2.88 | 2.52 | 2.71 |
| | 0.005 | 1.04 | 1.99 | 2.97 | | | | | |

TABLE II

*Zinc Analyses*

(PPM ZN)

| | In Standard Solutions | | | | | | | |
|---|---|---|---|---|---|---|---|---|
| Present | 0.0 | 5.0 | 20 | 40 | 50 | 60 | 80 | 100 |
| Found | 0.2 | 5.0 | 19.9 | 40.3 | 49.6 | 59.9 | 80.0 | 100.0 |
| | 0.2 | 5.0 | 20.0 | 40.0 | 49.5 | 60.0 | 80.0 | 99.0 |
| | 0.0 | | 20.0 | 40.3 | | 59.8 | 79.9 | 99.4 |

From the above it will be apparent that I have attained the objects of the invention and although it has been described with reference to specific embodiments, it should be understood that this is by way of illustration only, and that the invention is not limited thereto. Furthermore, in view of the description given, modifications will become apparent to those skilled in the art and such modifications and alternatives come within the scope of the invention described herein.

I claim:

1. In a polarographic apparatus for determining the amount of a known metal ion in a solution containing said ion and a known amount of a selected pilot metal ion, said polarographic apparatus including a test cell confining said solution and having a small polarizable electrode and a large non-polarizable electrode each in contact with said solution, a source of potential in circuit with said electrodes, a set of dividers of the potential from said source, a plurality of voltage balancing means individually connectible in circuit with said dividers and said electrodes for balancing each circuit and thereby measuring the diffusion current passing through said electrodes, and switch means for selectively impressing a plurality of potentials from said potential dividers across said electrodes to obtain a first balanced potential cancelling the effect of residual diffusion currents, a second balanced potential cancelling the effect of the pilot metal ion, and a third balancing potential providing direct reading of the concentration of said known metal ion, the improvement whereby a single polarographic apparatus may be employed with any of several known metal ions having a half-wave potential (SCE) in acid or neutral solution in the range of about +0.4 volt to about −1.4 volts and having a single well-defined reduction wave, and with any of several pilot metal ions having similar half-wave potential characteristics but having a limiting diffusion current of at least about 0.2 volt different from that of the known metal ion, which comprises: a plurality of said sets of dividers of the potential from said source of potential, each set corresponding to a pre-selected pair of known metal ion and pilot metal ion, and each set being replaceably connectible with said source of potential, the dividers in each set being adapted to produce appropriate voltages across the electrodes for obtaining the aforementioned three balanced potentials.

2. Apparatus of claim 1 wherein the aforementioned three balanced potentials are obtained in the order listed.

3. Apparatus of claim 1 wherein said sets of dividers are in modular plug-in form.

4. Apparatus of claim 1 wherein the small polarizable electrode is a dropping mercury electrode, and the large non-polarizable electrode is a mercury pool electrode.

5. Apparatus of claim 1 wherein said known metal ion is copper and the pilot metal is cadmium.

References Cited in the file of this patent

UNITED STATES PATENTS

| | | |
|---|---|---|
| 1,665,499 | Hoch | Apr. 10, 1928 |
| 1,781,802 | Bandoly | Nov. 18, 1930 |
| 2,773,020 | Offutt et al. | Dec. 4, 1956 |
| 2,773,021 | Offutt et al. | Dec. 4, 1956 |

OTHER REFERENCES

Nickelson: The Metal Industry, August 1942; pages 82–84.

Schulman et al.: The Review of Scientific Instruments, April 1947; pages 226–231.